Patented Nov. 8, 1949

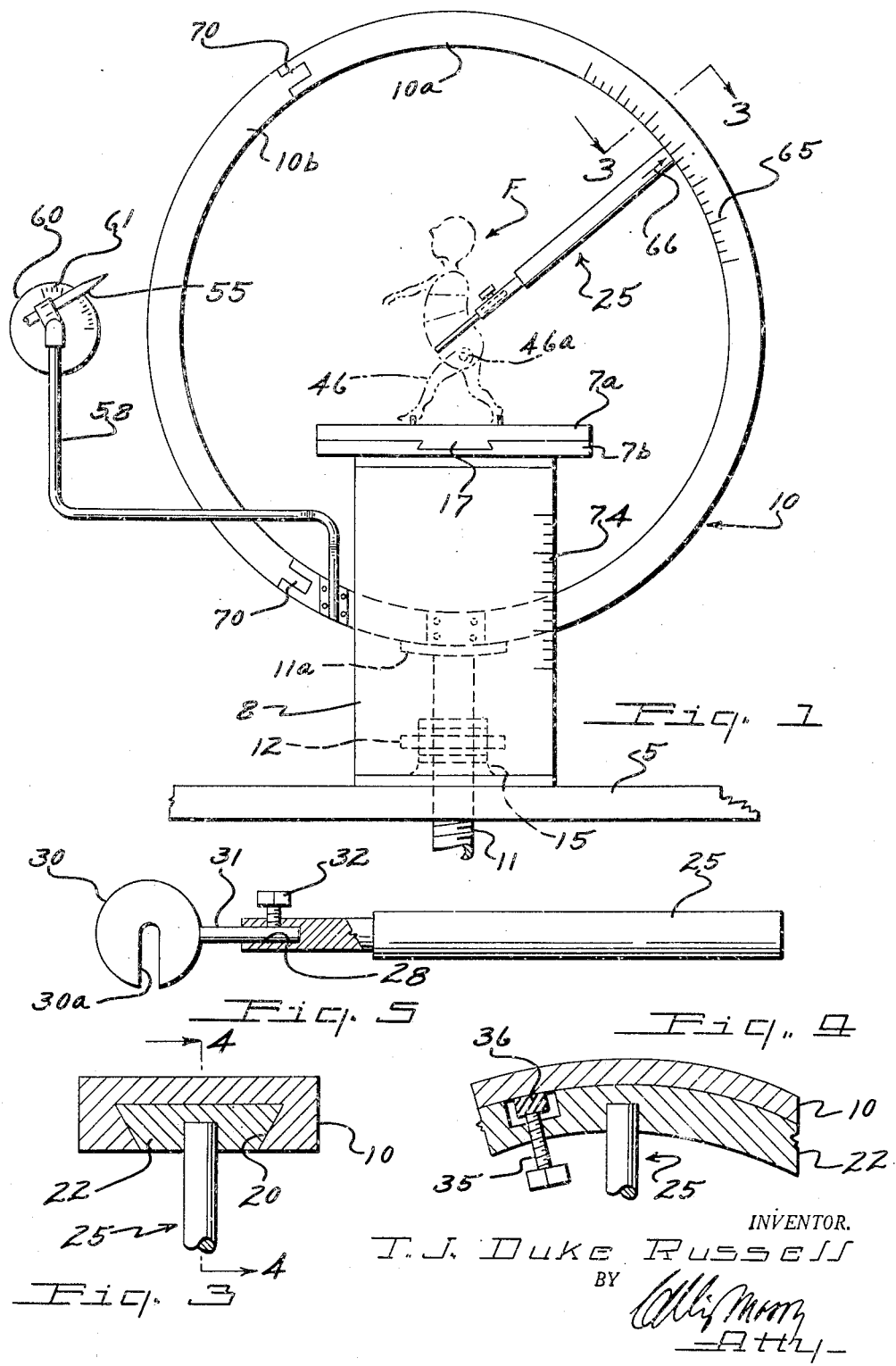

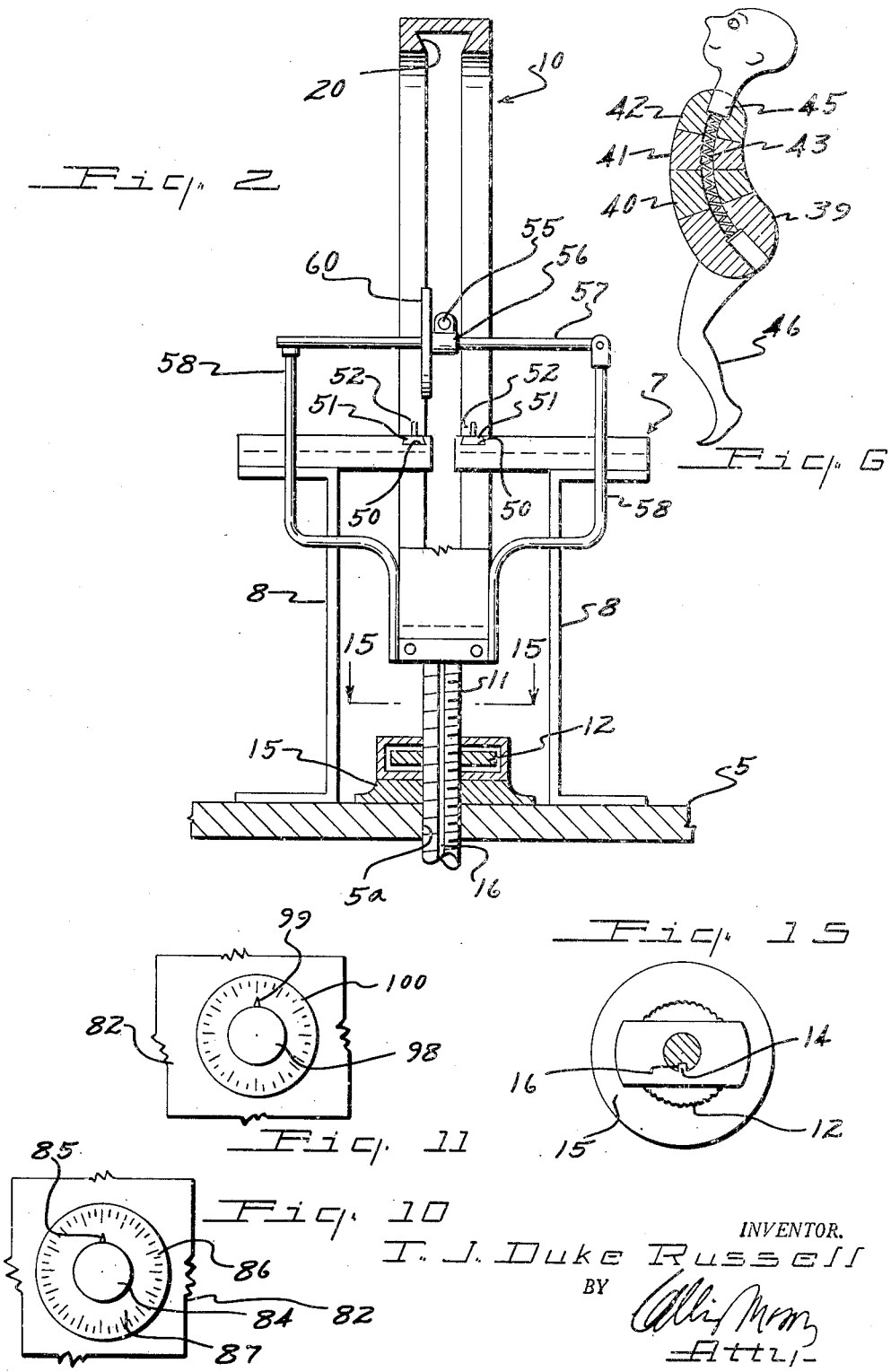

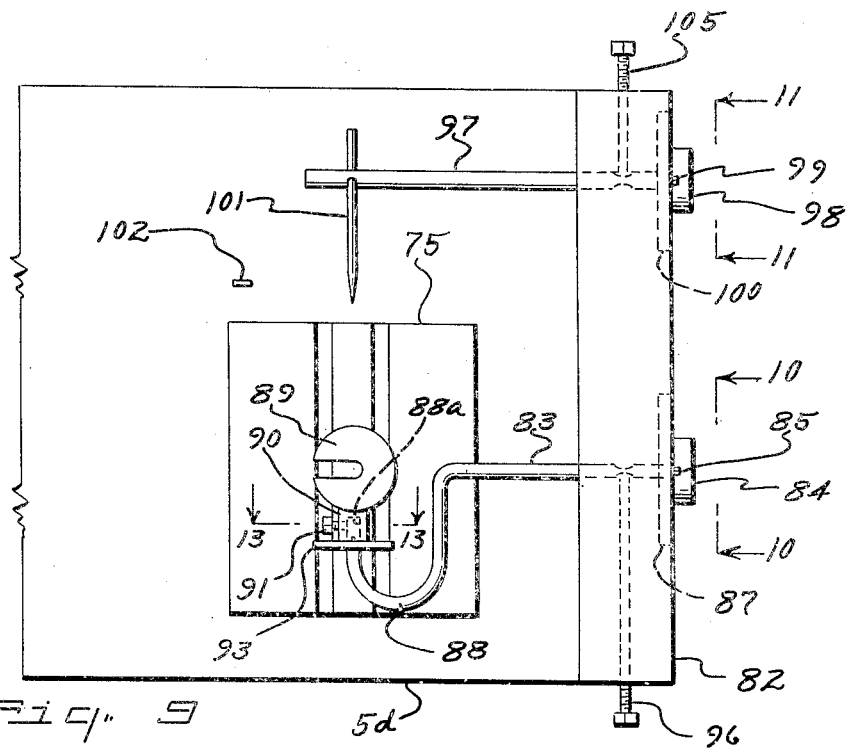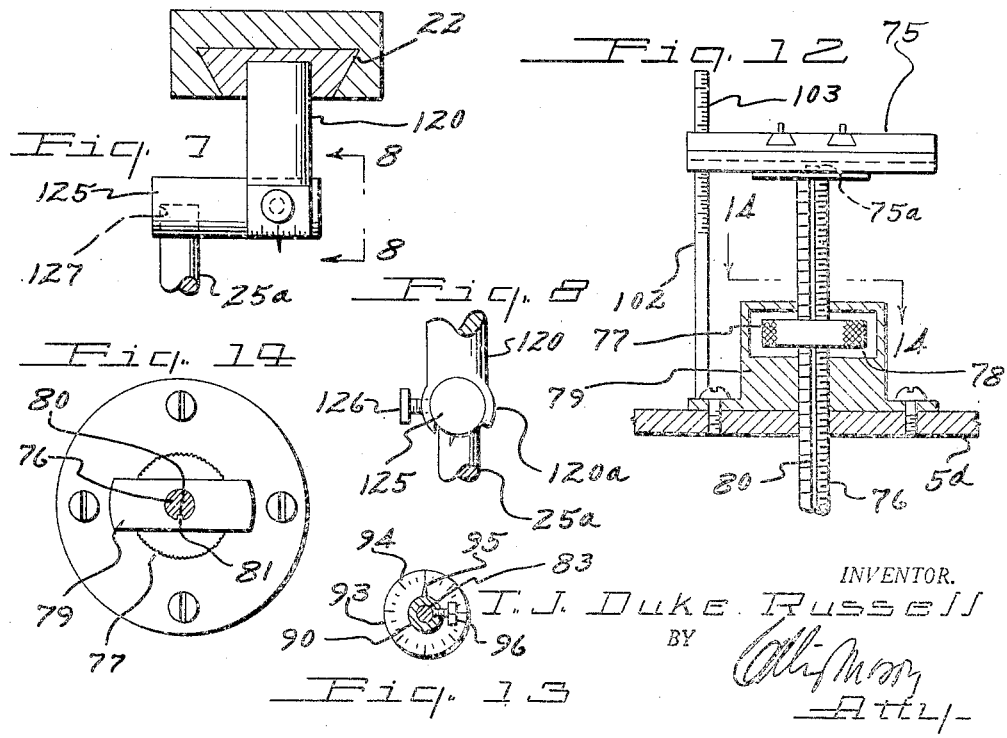

2,487,381

UNITED STATES PATENT OFFICE 2,487,381

MEANS FOR SUPPORTING OBJECTS IN SPACE IN ANIMATING APPARATUS

T. J. Duke Russell, Studio City, Calif.

Application October 17, 1944, Serial No. 559,092

9 Claims. (Cl. 88—16)

My invention has to do with the supporting and controlling of objects in space and, more particularly, relates to jigs for supporting objects in space in relation to a fixed point.

An object of the invention is to provide a device for supporting an object in various positions of adjustment relative to a common axis or center.

Another object is the provision in such a jig of novel means for effecting adjustment of the supported object into selected positions relative to a common axis or center.

It is also an object to provide a device for supporting an object for 360° adjustment about a common center of rotation and about two axes normal to each other.

For instance, while not so limited to use, my invention finds its present chief advantage as an aid in the making of animated cartoon pictures, advertising displays, etc., wherein for the guidance of the artist or photographer the figure forming the subject of the animation must be supported in various sequential positions relative to a common point so that when transferred to a strip of film or the like, the animation will appear smooth and each position will have a definite relationship to a starting or finishing point.

It is a further object of the invention to provide a means of accomplishing such support and adjustment of an object throughout the sequential steps of movement through an angular range of 360° relative to a common center.

Another object is to provide means for supporting an object in various positions of lateral adjustment relative to a fixed plane of rotation.

My invention possesses still further more or less subordinate objects and advantages and how those as well as the objects enumerated are achieved will be best understood from the following detailed explanation of one presently preferred embodiment of the invention. I wish it understood, however, that, in its broader aspects as defined by the appended claims, the invention is not intended to be confined to the details of construction now to be described, inasmuch as it is susceptible of being carried out in other specific manners which the following explanation will suggest to those working in the art.

For purposes of the following explanation I shall refer to the accompanying drawings, in which:

Fig. 1 is a side elevation;

Fig. 2 is a front elevation, with some parts shown in section;

Fig. 3 is an enlarged section on line 3—3 of Fig. 1;

Fig. 4 is a section on line 4—4 of Fig. 3;

Fig. 5 is an enlarged view partly in section and partly in plan of the object-supporting means;

Fig. 6 is a medial sectional view of an object to be supported;

Fig. 7 is an enlarged fragmentary section similar to Fig. 3 but showing a modified form of object-supporting means;

Fig. 8 is a view taken on line 8—8 of Fig. 7;

Fig. 9 is a top plan view showing a further modification;

Fig. 10 is a view taken on line 10—10 of Fig. 9;

Fig. 11 is a view taken on line 11—11 of Fig. 9;

Fig. 12 is a side elevation of the table portion of Fig. 9;

Fig. 13 is a view taken on line 13—13 of Fig. 9;

Fig. 14 is a view taken on line 14—14 of Fig. 12; and

Fig. 15 is a view taken on line 15—15 of Fig. 2.

Referring now to the drawings, the numeral 5 denotes a base upon which a table 7 is supported by angle iron legs 8 so that it always remains in fixed position relative to the base. The table is divided transversely of its middle for the purpose to be hereinafter explained. (See Fig. 2.)

A circular jig or guide member 10 is vertically movably supported relative to the base by means of a screw shaft 11 to the end flange 11a of which the peripheral portion of the jig 10 is secured, as by screws not shown. The screw shaft extends downwardly through the knurled nut 12 (Fig. 15) which is rotatably mounted in a housing 15 secured on the base. Thus by rotating the nut 12 the jig may be raised or lowered relative to the base and table so that its axis may be adjusted perpendicular to the table. The screw is held against rotation relative to the housing 15 by means of a lug 14 projecting into a longitudinal groove 16 in the screw.

While the table 7 is immovable perpendicular to the base, each of its halves is so constructed of companion sections 7a, 7b secured together by a dove tail 17, that the top section 7a may be moved laterally in one direction relative to the lower section 7b to which the legs 8 are secured.

Jig 10 has an inwardly opening annular dove tail groove 20 (see Fig. 3) along which a slide block 22 is slidable for the purpose of adjustably supporting an object such as a figure F. For carrying the object F I provide a radius rod 25 having one end secured in a recess in the block 22. A disc-like object-retaining member 30 fits between two adjacent sections of the object F and has an extension 31 of round cross section which projects into a recess 28 in the end of rod 25, being rotatably adjustably retained therein by a lock screw 32.

To secure the slide block 22 in any desired position of adjustment along the groove 20 I provide a screw 35 threadedly mounted in a hole in the block and carrying at its inner end a resilient block 36, such as of soft rubber, which frictionally engages the bottom of the groove 20 when the screw 35 is screwed inwardly.

The figure F has a body portion composed of four sections 39, 40, 41 and 42 held together by a coil spring 43, the spring passing through alined holes in the sections as well as through a slot 30a in the disc, so that the figure may be rotated relative to the disc if desired. The sections 39, 40, 41, 42 have their adjacent end surfaces disposed angular to each other and are rotatable relative to each other to simulate different postures or profiles. The figure has a head portion whose neck 45 removably and rotatably fits into a recess in the top body portion 42 so that different heads may be substituted. The legs 46 have angular end portions 46a which rotatably fit in side recesses in the body.

So that the legs of the figure may be moved to simulate walking, I provide the upper section 7a of each half of the table with a dove tail slot 50 within which a dove tail block 51 is slidably mounted and presents an upwardly projecting lug 52 to be secured to one of the feet of the figure (see Fig. 2). The blocks 51 are slidable relative to each other as well as to the table.

For coordinating the position of the extremities of the figure F with relation to the table or axis of the guide, I provide a swingable pointer 55 which is longitudinally slidably mounted in a collar 56. The collar is rotatably and longitudinally slidably mounted on a rod 57 of round cross section, the latter being secured at its respective ends on a pair of uprights 58 whose lower ends are secured to the respective sides of the jig 10. A disc 60 is axially secured on the rod 57 and has on its right face scale lines 61 denoting angular degrees so that it may be readily determined at what angle the pointer 55 is disposed. As will be observed the pointer is swingable in a plane parallel to the plane of the jig 10.

Inasmuch as the uprights 58 are carried by the jig 10, the position at which the pointer 55 is set relative to the figure or relative to the axis of the jig will not be changed by virtue of vertical movement of the jig relative to the base or table.

For indicating the angle of disposition of radius rod 25 I provide scale indicia 65 on the side of the jig, with which indicia an arrow 66 on the rod 25 is adapted to register.

While the jig 10 is shown as forming a complete circle whereby the slide block may be moved through a full 360° range, in some cases it may not be desirable or necessary to move the slide block through such a range. I therefore make the jig in two segments 10a, 10b which are joined by the transversely disposed tongues and grooves 70 so that one segment may be removed if desired. When it is desired to move the block 22 through a complete circle, or 360°, the object-supporting member 25 may pass through the space provided between the two halves of the table.

In use, the figure F is supported with its center of gravity at the axis of the jig. To position the table coordinate with the figure, the knurled nut 12 is rotated to move the screw shaft, which in turn moves the jig in a vertical plane and relative to the table. So that a record may be kept of the disposition of the axis of the jig relative to the table, I provide scale indicia 74 on either or both legs of the table. The disposition of the body of the figure is controlled by the radius rod or support 25 carried by the traveling block 22, whose angular disposition may be determined by reference to the scale 65. The relative position of the extremities or any other part of the figure may be further indicated by the pointer 55, the angle of disposition of which is determined by reference to the scale 61. For instance, if the animation to be accomplished is a somersault of the figure, the traveling block 22 is moved intermittently or in stages along the track or groove 20 to the respective positions corresponding to the positions in which the figure is to be pictorially reproduced. By recording the scale indications on a suitable chart, it is always easy to reassemble and reset the device even though it may be necessary at times to interrupt a commenced operation for the purpose of using the jig for another purpose.

In Figs. 7 and 8 I show a variational form of radius rod mounting which permits the radius rod to be adjusted laterally with respect to its longitudinal axis or with respect to the plane of the sides of the jig. Here there is a pin 120 mounted at its inner end in the slide block 22 and is bifurcated at its outer end 120a. A cross pin 125 is slidably and rotatably mounted between the bifurications, being retained in any adjusted position by a set screw 126. The radius rod 25a is secured in a radially opening socket 127 in the pin 125.

In Figs. 9 to 14, inclusive, I show a variational form of apparatus wherein I accomplish support of an object for 360° rotative adjustment about a common center of rotation and about two axes normal to each other.

Here I provide a table 75 which is constructed as before described except that it is adjustable in a direction perpendicular to the base 5d, being rotatably mounted upon the top end of a screw shaft 76 which latter is threadedly engaged by a nut 77 rotatably retained in a slot 78 in a housing 79. The screw shaft is longitudinally slotted as shown at 80, into which slot a lug 81 carried by the housing 79 projects to prevent rotation of the shaft relative to the housing. The top reduced end of the screw shaft rotatably fits in a downwardly opening socket 75a in the table to permit limited rotation of the table relative to the shaft.

On the base I mount an upright 82 transversely in which I journal for rotation a shaft 83 carrying an operating knob 84 on its inner or right-hand end. The knob carries a pointer 85 which is adapted to selectively register, upon rotation of the knob, with angle indicia 86 provided on a dial 87 countersunk in the upright. Adjacent its outer end the shaft is formed into a U-shaped portion 88. On the free end 88a of the U-shaped portion I rotatably mount an object-retaining radially slotted disc 89 which has a laterally projecting portion 90 presenting an axial socket to receive the free end 88a, a set screw 91 being threaded through the portion 90 for engagement with the free end 88a to lock the parts together in adjusted position. To indicate the angular position of adjustment of the disc 89 I provide integrally with the free end 88a a circular dial 93 on which I provide angle indicia 94, and the element 90 carries a pointer 95 to selectively register with said indicia upon rotation of the element 90. The shaft 83 may be locked in any position by means of a screw 96 threaded into the upright.

To indicate the position of any extremity of a figure carried by the disc 89 in any adjusted position, I provide a shaft 97 journalled for rotation in the upright parallel with shaft 83 and carrying an operating knob 98 presenting a pointer 99 for registration with angle indicia carried on a dial 100 countersunk in the outer face of the upright. Slidably mounted in a transverse hole in shaft 97 I provide a pointer 101. The shaft 97 may be locked in any adjusted position by means of the set screw 105.

To indicate the precise position of adjustment of the table relative to the base, I provide a post 102 carried by the base and presenting scale indicia 103 with which the top edge of the table is adapted to selectively register.

From the foregoing it will be observed that the center of the disc 89 and therefore the center of rotation of the figure carried by the disc, is in alinement with the longitudinal axis of shaft 83 as well as with the longitudinal axis of the free end portion 88a, so that movement of a figure carried by the disc is about this common point of rotation.

I claim:

1. In animating apparatus, a jig comprising an arched guide, an object-supporting member having one of its ends mounted on the guide for movement therealong, said object-supporting member projecting inwardly towards the axis of the guide and means pivotally mounted on the free end of said member for retaining an object, and pointer means for indicating the position of the supported object.

2. In animating apparatus, a jig comprising a circular guide having a circumferential dove tail groove, a dove tail block mounted in the groove for sliding movement therealong, adjustable friction-applying means for securing the block in adjusted position in the groove, a telescopic rod secured at one end to the block and being disposed radially inwardly to the axis of the guide, means for retaining an object on the free end of the rod, and means indicating a point with reference to which the object is retained.

3. In animating apparatus, a jig comprising a base, a circular guide, means mounting the guide on the base for movement perpendicular thereto, a table fixedly carried by the base, said table being disposed in a plane normal to the plane of the guide, an object-supporting member having one of its ends mounted on the guide for movement therealong, said member projecting inwardly towards the axis of the guide, object-retaining means carried by the free end of said member and operating means for moving said guide.

4. The device of claim 3 wherein the operating means comprises a screw shaft secured at one end to the guide and a nut rotatably carried by the base, said nut having threaded engagement with the shaft.

5. The device of claim 3 wherein the table is comprised of relatively slidable portions.

6. The device of claim 3 wherein the table is comprised of laterally spaced sections providing therebetween a passageway for the object-supporting member.

7. In animating apparatus, a jig comprising a base, a circular guide, means mounting the guide on the base for movement perpendicular thereto, a table fixedly carried by the base, said table being disposed in a plane normal to the plane of the guide, an object-supporting member having one of its ends mounted on the guide for movement therealong, said member projecting inwardly towards the axis of the guide, object-retaining means pivotally carried by the free end of said member, operating means for moving said guide, and pointer means carried by the guide, said pointer means being swingable relative to and in a plane parallel to the plane of the guide.

8. In animating apparatus, a jig comprising a circular guide, means mounting the guide on the base for movement perpendicular thereto, a table fixedly carried by the base, said table being disposed in a plane angular to the plane of the guide, a track disposed circumferentially of the guide, an object-supporting member having one of its ends mounted for movement along said track and being disposed at its other end at the axis of the guide, object-retaining means carried by the last-named end of the object-supporting member and operating means for moving the guide.

9. In animating apparatus, a guide comprising a body providing a continuous track defining a circle, a radius rod mounted at its outer end to slide along said track and projecting radially inwardly towards the axis of said circle, and means on the inner end of said rod for supporting an object for movement about the axis of the circle, said latter means comprising an object-retaining member rotatably mounted in the inner end of said rod for movement about the axis thereof.

T. J. DUKE RUSSELL.

REFERENCES CITED

The following references are of record in the file of this patent:

UNITED STATES PATENTS

| Number | Name | Date |
| --- | --- | --- |
| 1,228,722 | Verbeck | June 5, 1917 |
| 1,275,496 | Taylor et al. | Aug. 13, 1918 |
| 1,565,413 | Brock et al. | Dec. 15, 1925 |
| 1,652,271 | Cooke | Dec. 13, 1927 |
| 1,937,241 | Pardue et al. | Nov. 28, 1933 |
| 2,045,084 | Jackman | June 23, 1936 |
| 2,107,124 | Markert | Feb. 1, 1938 |
| 2,109,422 | Haughton | Feb. 22, 1938 |
| 2,177,709 | Gibbons | Oct. 31, 1939 |
| 2,279,241 | Musaphia | Apr. 7, 1942 |
| 2,294,437 | Allen et al. | Sept. 1, 1942 |
| 2,310,254 | Nassour | Feb. 9, 1943 |
| 2,312,158 | Garity | Feb. 23, 1943 |
| 2,327,059 | Pal | Aug. 17, 1943 |